G. W. Blake

Belt Fastener.

No. 3,064. Reissued Aug. 4, 1868.

Witnesses.

R. S. Spencer

H. V. Coombs

Inventor

G. W. Blake per Munn & Co

Attorneys

N. PETERS, PHOTO-LITHOGRAPHER, WASHINGTON, D. C.

UNITED STATES PATENT OFFICE.

JOHN ASHTON GREENE AND HENRY A. TWEED, OF NEW YORK, N. Y., ASSIGNEES, BY MESNE ASSIGNMENTS, OF G. W. BLAKE.

IMPROVED BELT-FASTENING.

Specification forming part of Letters Patent No. 28,033, dated April 24, 1860; Reissue No. 3,064, dated August 4, 1868.

*To all whom it may concern:*

Be it known that G. W. BLAKE, of Pepperell, in the county of Middlesex and State of Massachusetts, invented a new and Improved Mode of, and Means for, Fastening Belts or Bands; and the following is hereby declared to be a full, clear, and exact description of the same, reference being had to the accompanying drawing, forming a part of this specification, in which—

Figure 1:
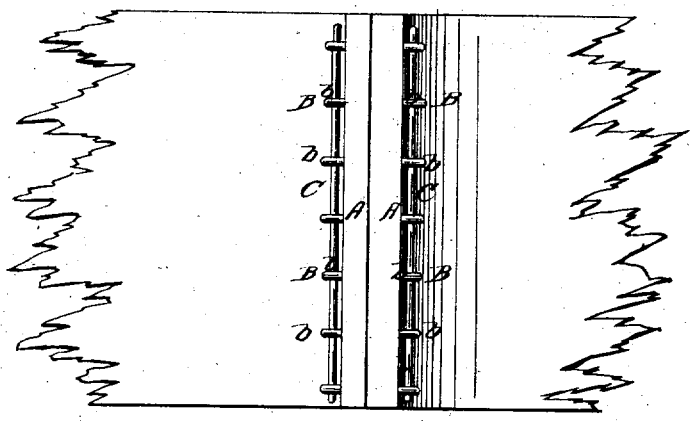
Figure 2:
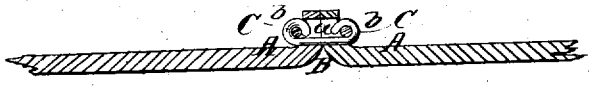

Figure 1 represents a plan or top view of two portions of a belt united in accordance with this invention; Fig. 2, a longitudinal vertical section of the same.

Similar letters of reference indicate corresponding parts.

This invention consists, first, in the employment, in connection with belts or bands, of a series of links or looped shanks, constructed to receive at either end a rod or locking-bar, substantially as hereinafter described; second, in the manufacture of belt-studs constructed with eyes or loops, so that a series of them may be locked or fastened at either end by a single rod or cross-bar; third, in the combination of double-eyed shanks with corresponding locking-bars; and, lastly, in the method, hereinafter described, of fastening belts by means of two metallic bars united together by means of shanks passing through the ends of the belt or band to be united.

To enable those skilled in the art to make and use this invention, the following description, referring to the drawings, is given in illustration of the manner in which the same is or may be carried into effect.

A A are the two ends of a belt, of leather or any other material commonly used for driving machinery.

To unite these ends so that the belt may run evenly and smoothly over the pulleys on which it is stretched, it is necessary that their inner sides be left perfectly smooth, and without any elevation or bulge which would cause the belt to jump.

To this end links or shanks B are used, which pass through slits *a*, cut into both ends of the belt, at suitable distances apart. The shanks are each furnished with two eyes, *b*, which are at such distances apart that when the links are passed through both ends of the belt, the eyes project far enough on each side to admit rods C, which extend the full width of the belt.

These rods prevent the loops slipping out, and the belt can be subjected to a heavy strain without its ends being torn asunder.

Comparatively thin iron wire, say No. 15 or 16 of the common wire-gauze, is sufficiently strong to enable the belt to sustain a weight of nearly four hundred pounds per inch of its width, and the inside of the belt is left without any bulge which would cause its uneven running.

Instead of using two-eyed links B for fastening the belt, simple chain-links might be used, long enough to pass through both ends of the belt, and to admit the rods C; but I prefer links such as represented in Fig. 2 in the drawing, as the same can be made cheap, and they adapt themselves readily to the surface of the pulleys over which the belt has to run.

The rods C may also be made in several sections.

This belt-fastener is equally applicable to large as well as to small belts, and its cheapness, and the facility with which the ends of the belt can be secured together, adapt it for universal use.

What is claimed as the invention of the said G. W. BLAKE is as follows:

1. The employment, in connection with belts or bands, of a series of links or looped shanks, constructed to receive at either end a rod or locking-bar, substantially as herein described.

2. The manufacture of belt-studs constructed with eyes or loops, so that a series of them may be locked or fastened at either end by a single rod or cross-bar, substantially as described.

3. The combination of double-eyed shanks with corresponding locking-bars, substantially as and for the purposes herein set forth.

4. The method herein described of fastening belts, by means of two metallic bars united together by shanks passing through the ends of the belt or band to be united, substantially as set forth.

In testimony whereof we have signed our names to this specification in the presence of two subscribing witnesses.

JOHN ASHTON GREENE.
HENRY A. TWEED.

Witnesses:
JOHN H. MCCOY,
TRUMAN H. BALDWIN.